United States Patent
Wobben

(10) Patent No.: US 7,083,377 B2
(45) Date of Patent: Aug. 1, 2006

(54) SYSTEM AND METHOD AND FOR USE IN HYDROELECTRIC POWER STATION AND HYDROELECTRIC POWER STATION EMPLOYING SAME

(76) Inventor: Aloys Wobben, Argestrasse 19, D-26607 Aurich (DE)

( * ) Notice: Subject to any disclaimer, the term of this patent is extended or adjusted under 35 U.S.C. 154(b) by 0 days.

(21) Appl. No.: 10/497,948

(22) PCT Filed: Dec. 11, 2002

(86) PCT No.: PCT/EP02/14030

§ 371 (c)(1),
(2), (4) Date: Sep. 24, 2004

(87) PCT Pub. No.: WO03/054386

PCT Pub. Date: Jul. 3, 2003

(65) Prior Publication Data

US 2005/0069413 A1    Mar. 31, 2005

(30) Foreign Application Priority Data

Dec. 12, 2001 (DE) .................... 101 60 916

(51) Int. Cl.
*F03B 13/10* (2006.01)
*F03B 15/02* (2006.01)

(52) U.S. Cl. .................. 415/1; 415/3.1; 416/88
(58) Field of Classification Search ........... 415/1, 415/3.3, 4.1, 4.3, 4.5, 7, 906, 908; 416/88; 290/54, 43

See application file for complete search history.

(56) References Cited

U.S. PATENT DOCUMENTS

| 3,535,540 | A | | 10/1970 | Boulogne |
| 4,025,228 | A | | 5/1977 | Lieber |
| 4,075,500 | A | * | 2/1978 | Oman et al. ............... 415/4.3 |
| 6,308,517 | B1 | | 10/2001 | Fausten et al. |
| 6,357,997 | B1 | * | 3/2002 | Rosefsky .................. 415/131 |

FOREIGN PATENT DOCUMENTS

| DE | 1 087 090 | | 8/1960 |
| DE | 188 08 328 | | 9/1999 |
| DE | 198 08 328 | | 9/1999 |
| EP | 16602 A1 | * | 3/1980 |
| EP | 0 110 141 | | 6/1984 |
| EP | 1 209 356 | | 5/2002 |
| FR | 789467 | | 10/1935 |
| FR | 1244750 | | 10/1960 |
| WO | WO 89/00646 | | 1/1989 |

* cited by examiner

*Primary Examiner*—Igor Kershteyn
(74) *Attorney, Agent, or Firm*—Neil A. Steinberg

(57) ABSTRACT

It is generally known in relation to hydroelectric power stations that, before the water impinges on the turbine of the hydroelectric power station and there delivers its energy to the turbine, the water flows through a pipe. Depending on the respective nature of the hydroelectric power station that pipe can be a downpipe through which the water flows, according to the respective local factors, in dependence on the fall height and the amount of water. In one aspect of the invention, the flow speed of the water (fluid) can be adjusted in the region of the turbine. In one aspect, a turbine is arranged within a flow pipe. The turbine has a variable cross-section, and thereby, the through-flow cross-section within the pipe is variable.

25 Claims, 1 Drawing Sheet

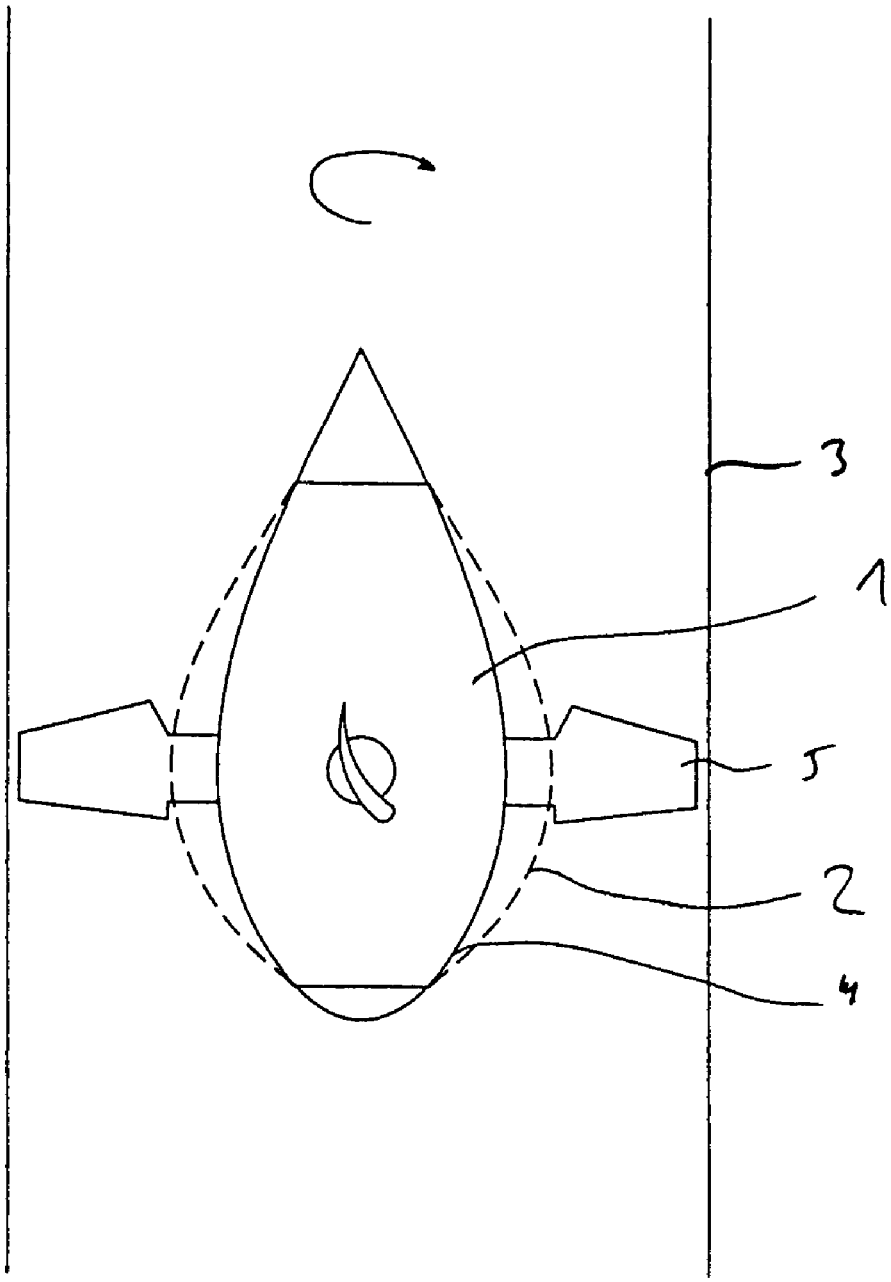

SYSTEM AND METHOD AND FOR USE IN HYDROELECTRIC POWER STATION AND HYDROELECTRIC POWER STATION EMPLOYING SAME

RELATED INFORMATION

It is generally known in relation to hydroelectric power stations that, before the water impinges on the turbine of the hydroelectric power station and there delivers its energy to the turbine, the water flows through a pipe. Depending on the respective nature of the hydroelectric power station that pipe can be a downpipe through which the water flows, according to the respective local factors, in dependence on the fall height and the amount of water.

After the water has delivered a part of its energy to the turbine, the water further flows away into a river.

The turbine of the hydroelectric power station is usually coupled to a generator, with which the kinetic energy of the turbine is converted into electrical energy, the electrical energy then in turn being fed into a power supply network.

Often a hydroelectric power station has not just one turbine but also a plurality of turbines and the water is fed to various turbines not just by way of a single pipe but by way of a plurality of pipes. Depending on the respective amount of water arriving suitable control of the amount of water for the individual pipes is then implemented so that an optimum degree of efficiency is achieved in the hydroelectric power station.

The turbines are each arranged in the downpipe itself or in the prolongation of the downpipe in the flow pipe.

The passage cross-section for the water in the downpipe, also in the region of the turbine (water impeller) in the flow pipe is fixed in that case at predetermined values.

The flow speed of the water in the region of the turbines is in this case usually adjusted by the volume flow, that is to say by the amount of water introduced in the downpipe or the flow pipe. Depending on the respective generator moment which is set, it is then possible to take the desired power from the system.

SUMMARY OF THE INVENTION

Now, the object of one aspect of the invention is to provide means, by which the flow speed of the water (fluid) can be adjusted in the region of the turbine.

According to one aspect the invention the turbine is so equipped that it has a variable cross-section.

BRIEF DESCRIPTION OF THE DRAWINGS

FIG. 1 is crass section view a turbine within a flow pipe.

DETAILED DESCRIPTION

As illustrated in the FIGURE the turbine 4 (water wheel) comprises a displacement body 1, on which the vanes 5 (rotor blades) of the turbine are mounted on the outside thereof. The turbine 4 with the vanes 5 can rotate in the flow pipe 3 and thus drive a suitably coupled generator (not shown in the FIGURE).

As can be seen in the illustrated example the cross-section of the displacement body is variable. For that purpose the displacement body 1 is in the manner of a bellows and is provided with an elastic surface. When now the bellows is supplied from the interior with a suitable pressure which is greater than the external pressure in the flow pipe, the bellows expands and assumes the shape indicated by the broken line 2. As the entire turbine is of a circular configuration and that also applies in respect of the bellows, the increased cross-sectional area of the displacement body automatically becomes a reduced cross-sectional area for the water within the flow pipe 3.

That reduced cross-sectional flow area for the water in the flow pipe automatically results in an increase in the flow speed so that the entire turbine is driven more rapidly than previously.

Expandability of the displacement body can be embodied by its elastic surface and, to expand the bellows, it can be provided that a fluid is pumped into the interior of the flow body or the bellows.

Thus, by means of adjustment of the cross-section of the displacement body, it is also possible for the speed of rotation of the entire turbine to be adapted to a desired value for the respective generator so that the speed of rotation of the turbine is optimally adapted to the generator system and thus the best possible degree of efficiency is also achieved.

The measure set forth in accordance with one aspect of the invention is extremely simple and nonetheless at the same time highly effective.

The arrangement for arresting and mounting the turbine is not shown in the FIGURE, for reasons of clarity thereof.

The invention claimed is:

1. A hydroelectric power station comprising:
    a flow pipe; and
    a turbine disposed within the flow pipe and caused to rotate when fluid flows through the pipe, the turbine having an enlargeable cross-section to reduce a cross sectional area for through-flow of fluid within the flow pipe.

2. The hydroelectric power station of claim 1 wherein the enlargeable cross-section comprises an enlargeable cross section to correspondingly reduce the cross sectional area for fluid flow.

3. The hydroelectric power station of claim 1 wherein the turbine comprises a deformable bellows to enlarge the enlargeable cross section.

4. The hydroelectric power station of claim 3 wherein the deformable bellows has an elastic surface.

5. The hydroelectric power station of claim 4 wherein the deformable bellows has an interior to receive fluid having a pressure greater than a pressure outside the deformable bellows.

6. The hydroelectric power station of claim 5 further comprising a generator coupled to the turbine, to convert kinetic energy into electrical energy.

7. The hydroelectric power station of claim 1 further comprising a generator coupled to the turbine, to convert kinetic energy into electrical energy.

8. The hydroelectric power station of claim 1 wherein the turbine comprises a body and rotor blades mounted on the body.

9. The hydroelectric power station of claim 1 wherein the enlargeable cross-section comprises an enlargeable cross section to reduce the cross sectional area for fluid flow providing in an increase in a flow speed of the fluid flowing within the pipe and an increase in a rotational speed of the turbine.

10. The hydroelectric power station of claim 1 wherein the turbine has a plurality of blades and the enlargeable cross-section comprises an enlargeable cross-section in the region of the plurality of blades.

11. The hydroelectric power station of claim 10 wherein the enlargeable cross-section comprises an enlargeable cross section to correspondingly reduce the cross sectional area for fluid flow.

12. The hydroelectric power station of claim 10 wherein the turbine comprises a deformable bellows to enlarge the enlargeable cross section.

13. The hydroelectric power station of claim 12 wherein the deformable bellows has an elastic surface.

14. The hydroelectric power station of claim 13 wherein the deformable bellows has an interior to receive fluid having a pressure greater than a pressure outside the deformable bellows.

15. The hydroelectric power station of claim 14 further comprising a generator coupled to the turbine, to convert kinetic energy into electrical energy.

16. The hydroelectric power station of claim 10 further comprising a generator coupled to the turbine, to convert kinetic energy into electrical energy.

17. The hydroelectric power station of claim 10 wherein the turbine comprises a body and the plurality of blades comprises blades mounted on the body.

18. A method for use in association with a hydroelectric power station having a flow pipe, the method comprising:
providing a turbine within the pipe to receive kinetic energy when fluid flows through the pipe; and
enlarging a cross-sectional area of the turbine to reduce a cross sectional area for fluid flowing within the flow pipe.

19. The method of claim 18 further comprising converting the kinetic energy into electrical energy.

20. The method of claim 18 wherein enlarging the cross sectional area comprises enlarging the cross sectional area to increase a flow speed of the fluid flowing within the pipe to adjust a rotational speed of the turbine to a generator system.

21. The method of claim 18 wherein enlarging the cross sectional area comprises enlarging the cross sectional area to increase a flow speed of the fluid flowing within the pipe to increase a rotational speed of the turbine.

22. A system comprising:
a flow pipe; and
a turbine disposed within the flow pipe and caused to rotate when fluid flows through the pipe, the turbine having an enlargeable cross-section to reduce a cross sectional area for through-flow of fluid within the flow pipe; and
wherein the turbine comprises a deformable bellows to enlarge the enlargeable cross section.

23. The system of claim 22 wherein the deformable bellows has an elastic surface.

24. The system of claim 23 wherein the deformable bellows has an interior to receive fluid having a pressure greater than a pressure outside the deformable bellows.

25. The system of claim 24 further comprising a generator coupled to the turbine, to convert kinetic energy into electrical energy.

* * * * *